US010467412B2

(12) United States Patent
Gurkok et al.

(10) Patent No.: US 10,467,412 B2
(45) Date of Patent: Nov. 5, 2019

(54) SOFTWARE CONTAINER MODELING

(71) Applicant: salesforce.com, inc., San Francisco, CA (US)

(72) Inventors: Cem Gurkok, Coral Gables, FL (US); Arun Kumar Jagota, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 252 days.

(21) Appl. No.: 15/726,261

(22) Filed: Oct. 5, 2017

(65) Prior Publication Data
US 2019/0108336 A1  Apr. 11, 2019

(51) Int. Cl.
*G06F 21/00* (2013.01)
*G06F 21/56* (2013.01)

(52) U.S. Cl.
CPC ............ *G06F 21/566* (2013.01); *G06F 21/56* (2013.01)

(58) Field of Classification Search
CPC ...... G06F 21/566; G06F 21/56; G06F 21/552; G06F 9/45558; G06F 9/45591; H04L 63/1433
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

OTHER PUBLICATIONS

U.S. Appl. No. 13/986,251, filed Apr. 16, 2013.

*Primary Examiner* — Yogesh Paliwal
(74) *Attorney, Agent, or Firm* — Dergosits & Noah LLP; Todd A. Noah

(57) ABSTRACT

A system determines a first volume of out-calls of a first out-call type made by a software container that is executing an application during a time period. The system determines a second volume of out-calls of a second out-call type made by the software container. The system determines a first ratio of the first volume to a combined volume of out-calls of all out-call types made by the software container. The system determines a second ratio of the second volume to the combined volume of out-calls of all out-call types made by the software container. The system determines a measure by comparing the first ratio to a third ratio associated with the first out-call type, and by comparing the second ratio to a fourth ratio associated with the second out-call type. The system identifies any behavior or any application type associated with the application, based on the measure.

20 Claims, 6 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0167094 A1* | 6/2012 | Suit ................ G06F 9/5077 718/100 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0121135 A1* | 4/2015 | Pape ................ G06F 11/1484 714/15 |
| 2015/0172563 A1 | 6/2015 | Jakobson et al. |
| 2018/0053002 A1* | 2/2018 | El-Moussa ............ G06F 21/53 |

\* cited by examiner

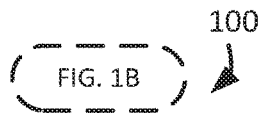

100

126 — Determine fifth volume of out-calls of first out-call type made by third layer of software container that is executing application during time period 128 — Determine sixth volume of out-calls of second out-call type made by third layer 130 — Determine ninth ratio of fifth volume to combined volume of out-calls of all out-call types made by third layer 132 — Determine tenth ratio of sixth volume to combined volume of out-calls of all out-call types made by third layer 134 — Determine additional measure by comparing ninth ratio to eleventh ratio associated with first out-call type, and by comparing tenth ratio to twelfth ratio associated with second out-call type 136 — Identify any behavior or any application type associated with application, based on additional measure

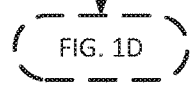

FIG. 1C

SOFTWARE CONTAINER MODELING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Operating-system—level virtualization, also known as containerization, refers to an operating system feature in which the operating system kernel enables the existence of multiple isolated user-space instances. Each of these instances, called software containers, partitions, virtualization engines, or jails, may appear like an ordinary computer from the point of view of an application program executing in the instance An application program, or application, executing on an ordinary computer's operating system can identify all of that ordinary computer's resources, such as connected devices, files and folders, network shares, central processing unit (CPU) power, and quantifiable hardware capabilities. However, an application executing inside a software container can only identify the software container's contents and the devices that are assigned to the software container. A software container can wrap a developing application in a complete environment containing everything that the application needs, such as memory, disk space, network access, and an operating system. The use of software containers reduces the time between application development and deployment. However, as the use of software containers grows, so does the potential for software container malware. Additionally, as the volume and diversity of normal application instances increases, the detection of unauthorized or malicious application instances in software containers becomes more difficult.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1A:
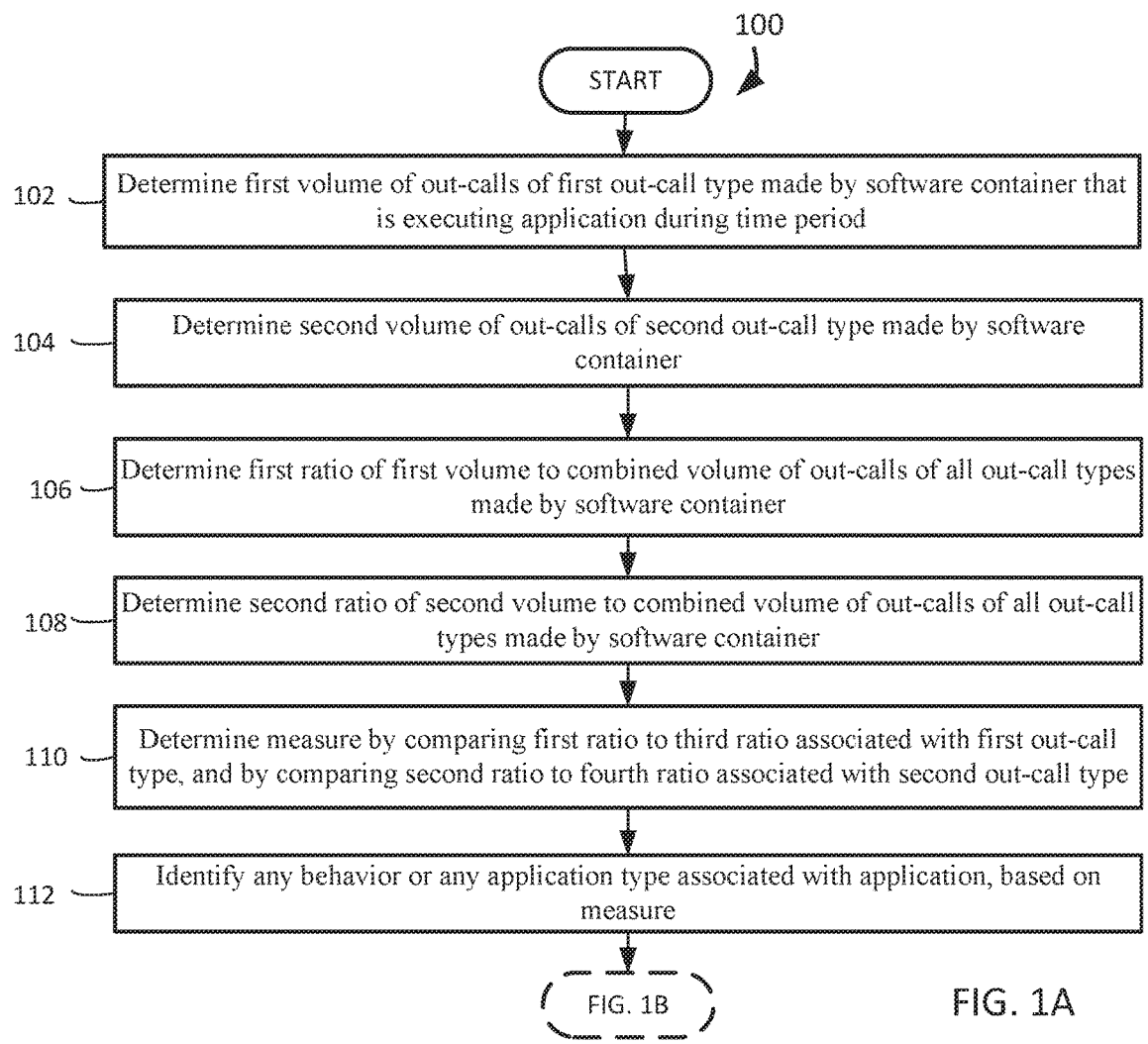
FIGS. 1 A-D depict an operational flow diagram illustrating a high-level overview of a method for software container modeling, in an embodiment.

Probabilistic and machine-learning based systems model software container behavior to address issues of software container malware and detection of unauthorized or malicious application instances in software containers. Software container models can identify anomalous software container instances, identify the application type of an anonymous software container instance, and detect a change in the behavior of a software container instance.

In accordance with embodiments described herein, there are provided methods and systems for software container modeling. A system determines a first volume of out-calls of a first out-call type made by a software container that is executing an application during a time period. The system determines a second volume of out-calls of a second out-call type made by the software container. The system determines a first ratio of the first volume to a combined volume of out-calls of all out-call types made by the software container. The system determines a second ratio of the second volume to the combined volume of out-calls of all out-call types made by the software container. The system determines a measure by comparing the first ratio to a third ratio associated with the first out-call type, and by comparing the second ratio to a fourth ratio associated with the second out-call type. The system identifies any behavior or any application type associated with the application, based on the measure.

For example, a system determines that a software container that executed an application, which its user had stipulated was a word processor application, for 24 hours had averaged 60 calls per hour to get-memory, and determines that the software container averaged 15 calls per hour to release-memory. The system determines that the average of 60 calls per hour to get-memory were 40% of the average of 150 out-calls per hour, and that the average of 15 calls per hour to release-memory were 10% of the average of 150 out-calls per hour. The system determines a relative entropy measure of 0.8 by comparing the software container's 40% of calls to get-memory and 10% of calls to release memory against the word processor application model's 10% of calls to get-memory and 10% of calls to release memory. The system uses the relative entropy measure of 0.8 to conclude that the user-stipulated word processor application executing in the software container is either an anomalously behaving word processor application or not an actual word processor application.

When software containers are modeled, each software container layer type may be modeled, including the operating system layer (such as Linux operating system), the meta-application layer (such as Apache Web Server, Tomcat Application Server, Solr Indexer), and the application layer (such as the java code for Data.com). Additionally, attributes that characterize software container behavior may be modeled, such as environment resources usage, which includes a software container's use of systems calls. The scope of these system calls includes every type of request, including system calls to memory, disk, databases, locally, and over a network. For brevity, environment resources usage may be denoted as out-calls. Out-calls may be characterized by method name and parameters. Models enable the tracking of the volume or velocity of every different out-call distinctly, up to parameters that may be put into enumerable buckets. That is, every combination (method name, parameters category) may be modeled distinctly, where parameters category takes the parameter vector and bins it into suitable categories, which may be chosen by the modeler, because the modeling, by design, may be limited to categorical attributes.

The out-calls model can model the distribution of out-calls over the various types of out-calls as a function of software container layer type. O denotes the universe of out-calls. In defining this universe O, the model is permitted to "explode" out each type of out-call (characterized by its name) further, by suitably categorizing the parameter vector space of this out-call. The model does not need to know the details of such an explosion. In a particular instance of this software container, and for a given time interval $[t_0, t_1]$ when it was running, for each $o \in O$, a certain number of invocations were made, which is denoted as the call volume of o. For example, if the time interval $[t_0, t_1]=1$ hour, this means that $t_1-t_0=1$ hour. Call velocity may be defined as the call volume divided by the width of the time interval. In every 1-hour time window, the call velocity is assumed to be the same, up to some normal statistical variation. For tractability of modeling, the call velocity is assumed to be stationary, such that the call velocity does not depend on $t_0$. $C_{w,a}(o)$ denotes the corresponding call velocity random variable. $C_{w,a}(o)$ denotes the call velocity of out-call o over time period w in a random instance of a software container of application type a. The model estimates the mean (and variance) of $C_{w,a}(o)$ from executing (or historically executed) instances of software containers of application type a. From these estimates, an out-calls distribution is formed as: $P_{w,a}(o)=m_{w,a}(o)/\Sigma_{o' \in O} m_{w,a}(o')$, where $m_{w,a}(o)$ is the mean of $C_{w,a}(o)$ from executing (or historically executed) instances of software containers of application type a.

For example, o=get-memory, a particular instance of a software container of application type a has been running for a day (exactly 24 hours), w=1 hour, this instance a has made an average of 10 calls to get-memory per hour, and this instance a has made an average of 100 calls to any system call per hour, i.e. any $o \in O$. For this example, $P_{w,a}(o)=0.1$. That is, on average 1/10th of the system calls every hour are to get-memory. A simpler model defines $P_{w,a}(o)$ as the number of calls made to o divided by the number of all calls made, over the entire 24-hour period. However, this simpler model is less expressive. Specifically, the simpler model does not assess the goodness of the stationarity assumption, that is whether the call velocities in the various time periods vary a lot or vary only a little. The hourly varying of the call velocities may depend on the system call o, and also on the time period duration, such as one hour, one day, etc. In the above, $m_{w,a}(o)$ is the mean over the realizations of $C_{w,a}(o)$ in the training instances of software containers of application type a. Thus, for any fixed w and a, $P_{w,a}(o)$ forms a probability distribution over the universe of all out-calls. The parameterization on w enables the modeling of such distributions over time periods of different durations, such as the last hour, the last day, the last week, etc.

A software container instance has a layered structure. By modeling the layers explicitly, the resource usage of a software container instance may be broken down by layer, which provides more detailed insight. Additionally, the models of upper layers may be learned more accurately by pooling together the behavior of all software container instances that use these layers. The first layer is the base operating system layer (such as Linux). The second layer is the meta-application layer (such as Apache web server). The third layer is typically the application type of this particular software container instance. More generally, software container instances can have multiple meta-application layers and also multiple application type layers. An example is a software container instance which has Java as the first meta-application layer and Tomcat as the second meta-application layer.

From the out-call velocities model, probability distributions over the systems calls may be constructed at any layer. Starting with the case when there are exactly three layers ($L_1=i$, $L_2=j$, $L_3=k$), i indexes distinct base operating system values, j indexes distinct meta-layer 1 values, and k indexes distinct application type values. $C_{w,i,j,k}(o)$ denotes the velocity of system call o done by any software container instance whose layer sequence is ($L_1=i$, $L_2=j$, $L_3=k$) over a time period of width w, which is the accumulated velocity over all the layers of this software container instance. $C_{w,i,j,k}(o)$ is modeled as a Hierarchical ANOVA model. To simplify notation, w is suppressed, as w remains fixed in the model $C_{i,j,k}(o)=\mu(o)+e_i(o)+e_{j|i}(o)+e_{k|ij}(o)$. $\mu(o)$ is the mean velocity of this system call, and is taken over all software container instances of all types running in the same environment. $e_i(o)$ is the effect of $L_1=i$ for this system call, and is estimated as follows. $C_i(o)$ denotes the mean velocity of this system call over all software container instances of all types in which $L_1=i$, such that the calls are on top of the base operating system i, and $e_i(o)=C_i(o)-\mu(o)$. Next, $e_{j|i}(o)$ is the effect of $L_2=j$ given that $L_1=i$, $C_{i,j}(o)$ denotes the mean velocity of this system call over all software container instances of all types in which $L_1=i$ and $L_2=j$, and $e_{j|i}(o)=C_{i,j}(o)-C_i(o)$. Similarly, $e_{k|ij}(o)=C_{i,j,k}(o)-C_{i,j}(o)$.

For example, w=1 hour, across all instances of all software containers the get-memory operation is invoked an average of 15 times an hour, and when this average is restricted to software container instances running on the Mac Operating System, this average becomes 12 times an hour. Therefore, $15+e_{MacOS}(\text{get-memory})=12$, such that $e_{MacOS}(\text{get-memory})=-3$. That is, a container running on the Mac Operating System on average makes 3 less out-calls to get-memory than a container running on any operating system does on average. Next, the average number of out-calls to get-memory from all application instances executing on the Mac Operating System and the Apache Web Server meta-application layer=13. Therefore, $15+e_{MacOS}(\text{get-memory})+e_{Apache\ Web\ Server|MacOS}(\text{get-memory})=13$, such that $e_{Apache\ Web\ Server|MacOS}(\text{get-memory})=1$. Next, the average number of out-calls to get-memory from application instances of software container C executing on the Mac Operating System and the Apache Web Server meta-application layer=14. Therefore, $15+e_{MacOS}(\text{get-memory})+e_{Apache\ Web\ Server|MacOS}(\text{get-memory})+e_{C|Apache\ Web\ Server|MacOS}(\text{get-memory})=14$, such that $e_{C|Apache\ Web\ Server|MacOS}(\text{get-memory})=1$. The value of computing these effects is that they sharply bring into focus how the call velocities are influenced by particular base operating systems, meta-application layers, and software container types.

This computation of effects may be generalized to the case in which there is a base operating system layer, followed by one or more meta-application layers, and followed by one or more application type layers. The only assumption made over the universe of all software container types is that this layering scheme forms a hierarchy. The model $C_{i,j,k}(o)=\mu(o)+e_i(o)+e_{j|i}(o)+e_{k|ij}(o)$ works here, with the only change being to generalize the notation. Specifically, $L=(l_1 \ldots l_n)$ denotes the sequence of layers that characterizes a particular software container type, and $l_i$, $i=1 \ldots n$ is the value at layer i. This generalization results in the model $C_L(o)=\mu(o)+e_{l_1}(o)+e_{l_2|l_1}(o)+ \ldots +e_{l_n|l_{n-1}}(o)$, with the mean $\mu(o)$ and the effects $e(o)$ being estimated exactly as before.

Out-call distributions are compared to determine how similar two out-call distributions are to each other, which may be quantified by using the so-called relative entropy measure. P and Q denote two probability distributions over the same discrete sample space, the universe of out-calls. The relative entropy from P to Q is $D(P\|Q)=\Sigma_i\ P(i)\log P(i)|Q(i)$.

This measure is asymmetric, such that in general $D(P\|Q)\neq TD(P|Q)$. The desired symmetry is easily achievable as $[D(P\|Q)+D(Q\|P)]/2$, a measure that may be used in the following use cases. For example, $D(P\|Q)$ is a use case agnostic measure, A (get-memory) and B (release-memory) are the two values in the sample space, $P_A=0.5$, $P_B=0.5$, $Q_A=0.8$, and $Q_B=0.2$. Since P and Q are quite different, $D(P\|Q)$ is expected to be >0. $D(P\|Q)=P_{A\ log}\ P_A|Q_A+P_{B\ log}\ P_B|Q_B=0.5*\log(0.5/0.8))+0.5*\log(0.5/0.2)=-0.34+0.66=0.32$. If absolute values are taken of determined elements prior to summing, then $D(P\|Q)=1.00$. It is customary to use base 2 for the logarithms.

Application Type Prediction use case: After models have been learned for various application types (on the same base operating systems) from historical executed instances of these application types, and a "new" instance whose application type is unknown has been running for a while, an instance model may be learned from this new application instance. By comparing this new application instance's model with those models of the various application types, application type models may be identified—if any—that are sufficiently similar to the new application instance's model. The type of the new application instance may be predicted in terms of the application types of these "neighboring" models. In the field of machine learning, this is called the k nearest neighbors' algorithm. A sophisticated variant of this would be that for each application type, multiple models are learned at differing time scales. Likewise, models are learned at the same differing time scales for the new application instance. Then the model comparison is generalized to comparisons of all these models at the differing time scales.

Application Type Inconsistency Detection use case: A user may stipulate the application type of new instance of an application that the user is developing in a software container. A model of the user's new instance can be compared with a model of the user-stipulated application type. If these two types are different, the application type of the user's new instance and the user-stipulated type are inconsistent. By comparing the new application instance's model against the model of this new application instance's user-stipulated application type, a better assessment may be made. For example, if new application instance's behavior is anomalous relative to the user-stipulated application type's behavior, then this strengthens the confidence that the user-stipulated application type is not the actual application type of the user's new instance. By using the previous method, the application type of a new instance may be predicted, and then compared with any user-stipulated application type. If these two types are different, the predicted type and the user-stipulated type are inconsistent. By comparing the new application instance's model against the model of this new application instance's user-stipulated application type, a better assessment may be made. For example, if the user-stipulated and predicted application types are different and the new application instance's behavior is anomalous relative to the user-stipulated application type's behavior, then this strengthens the confidence that the user-stipulated application type is wrong.

Anomalous Instance Detection—Known Application Type use case: After a model has been learned for a particular application type from historical execution data of instances of this application type, and a new instance of this application type is executing, a model may be learned for this new application instance from its behavior. By comparing this new application instance's model with the models of its application type, an assessment may be made about how much this new application instance's behavior's deviates from the normal behavior for this application type. As in the previous use case, a more sophisticated variant of this would compare the application type models with the new application instance models at multiple time scales.

Anomalous Instance Detection—Unknown Application Type use case: This is a variant of the previous problem in which the new instance's application type is unknown. A model may be learned from this new application instance and compared to the models of all known application type instances. If this newly learned model is very different from all these previously learned models, this new application instance is anomalous. Note that the power of this method (its ability to detect anomalous application instances) decreases as the number of known application types (with varying behaviors) increases. To alleviate this issue, the layered model may be used. That is, even though the application type of this new instance is unknown, perhaps more is known about its layers. For example, the base operating system on which this new application instance is working is known, and maybe the various meta-application layers are also known. The layered models enable the leveraging of this layer information. As in previous use cases, layered model comparisons may be done at multiple time scales.

Instance Behavior Change Detection use case: Models may be learned for a new software container instance at various time periods, such as once every week. By comparing models of previous time periods with the model of the most recent time period, if any significant changes of behavior, by the new software container instance have occurred, these changes may be detected. Sudden behavior change may be detected by comparing models of two adjacent time periods. Gradual behavior change may be detected by comparing models whose time periods are much further apart.

Methods and systems are provided for software container modeling. First, a method for software container modeling will be described with reference to example embodiments. Then a system for software container modeling will be described.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1B:
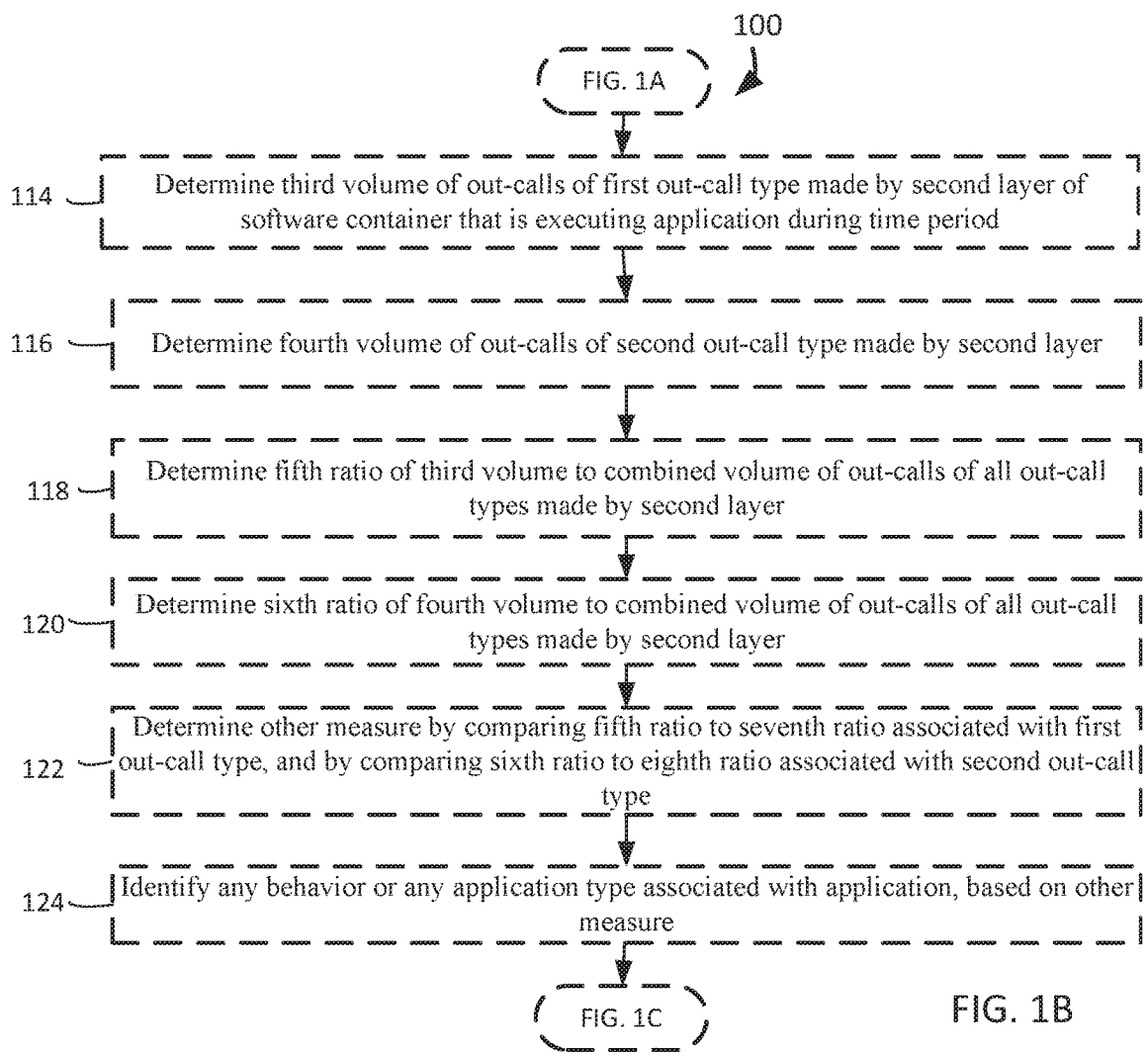
Figure 1D:
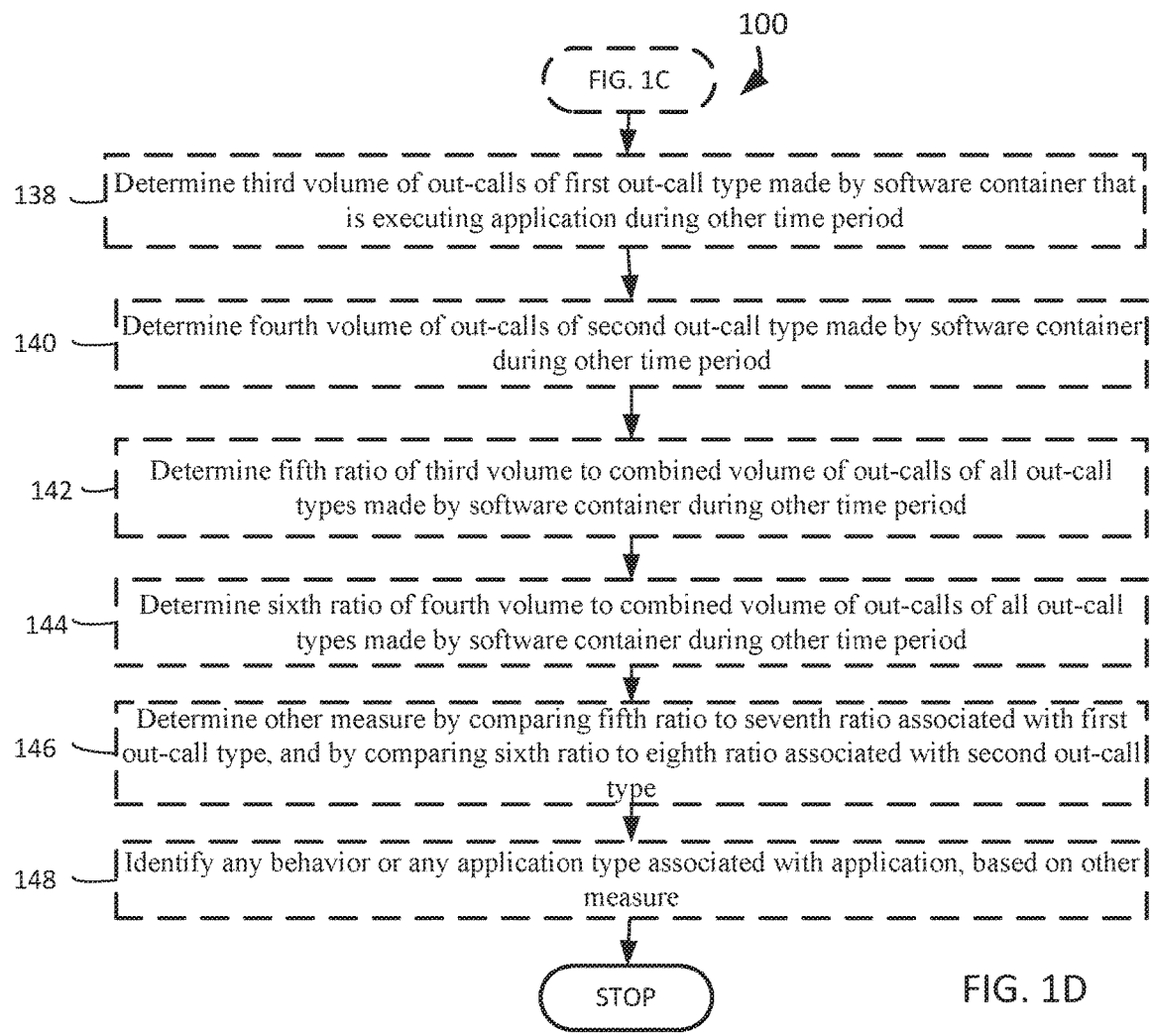

FIGS. 1 A-D depict an operational flow diagram illustrating a high-level overview of a method 100 for software container modeling. The method 100 may be implemented on either a centralized computing platform or in parallel on a distributed computing platform.

A system determines a first volume of out-calls of a first out-call type made by a software container that is executing an application during a time period, box 102. The system counts the number of out-calls made by a software container, based on out-call types. For example, and without limitation, this can include the system determining that a software container that executed an application, which its user had stipulated was a word processor application, for 24 hours had averaged 60 calls per hour to get-memory. A volume can be the amount or quantity of something. An out-call type can be a category of an environment resource usage, the category having common characteristics. A software container can be an isolated computer program execution environment enabled by a computer's operating system. An application can be a computer program or piece of software designed and written to fulfill a particular purpose of a user. A time period can be a length or portion of existence in the past, present, and/or future, as measured in seconds, minutes, hours, days, weeks, months, and/or years.

While counting one type of out-call, the system determines a second volume of out-calls of a second out-call type made by the software container, box 104. The system counts the number of out-calls made by a software container, based on out-call types. By way of example and without limitation, this can include the system determining that the software container that executed the user-stipulated word processor application for 24 hours had averaged 15 calls per hour to release-memory.

Having counted out-calls, the system determines a first ratio of the first volume to a combined volume of out-calls of all out-call types made by the software container, box 106. The system determines out-call probabilities based on out-call types. In embodiments, this can include the system determining that the average of 60 calls per hour to get-memory were 40% of the average of 150 out-calls per hour. Although this example describes the system determining the ratio of one type of out-calls to all types of out-calls, the system can determine a ratio of one type of out-call to any number of other types of out-calls, and the ratio may be expressed as a percentage or a probability. A ratio can be the quantitative relation between two amounts showing the number of times one value contains or is contained within the other. A combined volume can be the amount or quantity of some things.

After counting out-calls, the system determines a second ratio of the second volume to the combined volume of out-calls of all out-call types made by the software container, box 108. The system determines out-call probabilities based on out-call types. For example, and without limitation, this can include the system determining that the average of 15 calls per hour to release-memory were 10% of the average of 150 out-calls per hour.

Having determined out-call probabilities, the system determines a measure by comparing the first ratio to a third ratio associated with the first out-call type, and by comparing the second ratio to a fourth ratio associated with the second out-call type, box 110. The system measures the similarity between the container's out-call probabilities for the time period and other out-call probabilities. By way of example and without limitation, this can include the system determining a relative entropy measure of 0.8 by comparing the software container's 40% of calls to get-memory and 10% of calls to release memory against the word processor application model's 10% of calls to get-memory and 10% of calls to release memory. In a more detailed example, the system determines a relative entropy measure by comparing the software container's 40% of calls to get-memory, 10% of calls to release memory, 10% of calls to write to disk, 10% of calls to read from disk, 10% of calls to write to a database, 10% of calls to read from the database, 5% of calls to send data over a network, and 5% of calls to request data over the network against the word processor application model's 10% of calls to get-memory, 10% of calls to release memory, 10% of calls to write to disk, 10% of calls to read from disk, 10% of calls to write to a database, 10% of calls to read from the database, 20% of calls to send data over a network, and 20% of calls to request data over the network. Although these examples describe the system determining a measure that is a relative entropy measure, the system can determine any type of measure that approximates or estimates the similarities and/or differences between a first set of ratios and a second set of ratios. Even though these examples describe the system comparing corresponding ratios to determine a relative entropy measure, the system can sum the absolute value from each individual comparison so that a positive value based on the comparison of corresponding ratios is not negated by a negative value based on the comparison of other corresponding ratios. A measure can be an indication of assessing the degree, extent, or quality of something.

In an alternative example, the system determines a word processor application relative entropy measure of 0.8 by comparing 40% of the calls by an unknown application type executing in a software container to get-memory and 10% of calls to release memory against 10% of the calls by the word processor application model to get-memory and 10% of calls to release memory. Further to the alternative example, the system determines a spreadsheet application relative entropy measure of 0.4 by comparing 40% of the calls by the unknown application executing in the software container to get-memory and 10% of calls to release memory to 20% of the calls by a spreadsheet application model to get-memory and 10% of calls to release memory. Although this alternative example describes the system comparing a container's ratios to two model's corresponding ratios to determine two measures, the system can compare a container's ratios to any number of models' corresponding ratios to determine any number of measures.

After determining a similarity measure, the system identifies any behavior or any application type associated with the application, based on the measure, box 112. The system uses the similarity measure to evaluate the container's application. In embodiments, this can include the system using the relative entropy measure of 0.8 to conclude that the user-stipulated word processor application executing in the software container is either an anomalously behaving word processor application or not an actual word processor application. The system can identify anomalous behavior and/or an application type by comparing the determined measure to at least one threshold measure that enables the system to determine a degree of anomalous behavior corresponding to the at least one threshold and/or determine a degree of matching to at least one known application type corresponding to the at least one threshold.

In an alternative example, the system uses the spreadsheet application relative entropy measure of 0.4 to determine that the unknown application executing in the software container is likely to be a spreadsheet application, and uses the word processor application relative entropy measure of 0.8 to determine that the unknown application executing in the software container is unlikely to be a word processor application. A behavior can be the way in which something works or functions. An application type can be a category of a computer program or piece of software designed and written to fulfill a particular purpose of a user, the category having common characteristics.

The third ratio and the fourth ratio may be associated with the application during another time period. For example, the system determines a relative entropy measure of 0.8 by comparing a software container's 40% of calls to get-memory and 10% of calls to release memory on Saturday against the same software container's 10% of calls to get-memory and 10% of calls to release memory on the preceding Friday. Continuing this example, the system uses the relative entropy measure of 0.8 to identify a sudden behavior change, relative to the previous day's behavior, by a known word processer application executing in the software container. In another example, the system determines a relative entropy measure of 0.8 by comparing a software container's 40% of calls to get-memory and 10% of calls to release memory on Saturday to the same software container's 10% of calls to get-memory and 10% of calls to release memory on the previous Saturday. Continuing this other example, the system uses the relative entropy measure of 0.8 to identify a gradual behavior change, relative to the previous Saturday's behavior, by a known word processer application executing in the software container.

Similarly, the system can identify anomalous behavior for known application types. For example, the system determines a relative entropy measure of 0.8 by comparing 40% of calls by a known word processor application executing in a software container to get-memory and 10% of calls to release memory against 10% of the calls by the word processor application model to get-memory and 10% of calls to release memory. Continuing this example, the system uses the relative entropy measure of 0.8 to identify anomalous behavior by the known word processer application executing in the software container. In another example, the system determines a relative entropy measure of 0.4 by comparing 20% of the calls by the known processor application executing in the software container to get-memory and 10% of calls to release memory over a week to 10% of the calls by the word processor application model to get-memory and 10% of calls to release memory over a previous week. Continuing this other example, the system uses the relative entropy measure of 0.4 to identify anomalous behavior by the known word processer application executing in the software container.

The first ratio, the second ratio, the third ratio, and the fourth ratio may be associated with a first layer of the software container. For example, the system determines a relative entropy measure of 0.8 by comparing 40% of the calls by the base operating system layer of the software container to get-memory and 10% of calls to release memory against the 10% of calls by the base operating system layer of the word processor application model to get-memory and 10% of calls to release memory. In this example and the following examples, the first layer is the base operating system layer, the second layer is the meta-application layer, and the third layer is the application layer.

Having determined a similarity measure based on the container's first layer, the system optionally determines a third volume of out-calls of the first out-call type made by a second layer of the software container that is executing the application during the time period, box 114. The system counts the number of out-calls made by software container layers, based on out-call types. For example, and without limitation, this can include the system determining that the meta-application layer of the software container that executed the user-stipulated word processor application for 24 hours had averaged 30 calls per hour to get-memory. A layer can be a separate functional component of computer programming that interacts in some sequential and hierarchical way, with each separate functional component usually having an interface only to the separate functional component above it and the separate functional component below it.

While counting one type of out-call made by a layer, the system optionally determines a fourth volume of out-calls of the second out-call type made by the second layer of the software container, box 116. The system counts the number of out-calls made by software container layers, based on out-call types. By way of example and without limitation, this can include the system determining that the meta-application layer of the software container that executed the user-stipulated word processor application for 24 hours had averaged 15 calls per hour to release-memory.

Having counted out-calls by layer, the system optionally determines a fifth ratio of the third volume to a combined volume of out-calls of all out-call types made by the second layer of the software container, box 118. The system determines out-call probabilities based on out-call types and software container layers. In embodiments, this can include the system determining that the meta-application layer's average of 30 calls per hour to get-memory were 20% of the average of 150 out-calls per hour.

After counting out-calls by layer, the system optionally determines a sixth ratio of the fourth volume to the combined volume of out-calls of all out-call types made by the second layer of the software container, box 120. The system determines out-call probabilities based on out-call types and software container layers. For example, and without limitation, this can include the system determining that the meta-application layer's average of 15 calls per hour to release-memory were 10% of the average of 150 out-calls per hour.

Having determined out-call probabilities by layer, the system optionally determines another measure by comparing the fifth ratio to a seventh ratio associated with the first out-call type, and by comparing the sixth ratio to an eighth ratio associated with the second out-call type, box 122. The system measures the similarity between the container layer's out-call probabilities and other out-call probabilities. By way of example and without limitation, this can include the system determining a relative entropy measure of 0.2 by comparing 20% of the calls by the meta-application layer of the software container to get-memory and 10% of calls to release memory against 10% of the calls by the meta-application layer of the word processor application model to get-memory and 10% of calls to release memory.

After determining another similarity measure, the system optionally identifies any behavior or any application type associated with the application, based on the other measure, box 124. The system uses the other similarity measure to evaluate the software container's application. In embodiments, this can include the system using the relative entropy measure of 0.2 to suggest that the meta-application layer of the user-stipulated word processor application executing in the software container is a properly behaving meta-application layer of an actual word processor application. When the system determines a measure based on comparing the ratios for the second layer of a software container against the ratios for the second layer of a model, the system identifies any behavior or any application type based on the measures for the first and second layers. For example, when considered in isolation, the relative entropy measure of 0.2 for the meta-application layer may seem to indicate that the meta-application layer of the user-stipulated word processor application is a properly-behaving meta-application layer of an actual word processor application. However, when the relative entropy measure of 0.2 for the meta-application layer is combined with the relative entropy measure of 0.8 for the base operating system layer, this combination indicates that the user-stipulated word processor application is either an anomalously behaving word processor application or not an actual word processor application. Although the preceding example described the system determining one measure based on a corresponding meta-application layer, the system can determine any number of measures based on corresponding meta-application layers.

Having determined similarity measures based on the software container's first two layers, the system optionally determines a fifth volume of out-calls of a first out-call type made by a third layer of the software container that is executing the application during the time period, box 126. The system counts the number of out-calls made by a software container, based on out-call types and software container layers. For example, and without limitation, this can include the system determining that the application type layer of the software container that executed the user-stipulated word processor application for 24 hours had averaged 30 calls per hour to get-memory.

While counting one type of out-call made by the third layer, the system optionally determines a sixth volume of out-calls of the second out-call type made by the third layer of the software container, box 128. The system counts the number of out-calls made by a software container, based on out-call types and software container layers. By way of example and without limitation, this can include the system determining that the application type layer of the software container that executed the user-stipulated word processor application for 24 hours had averaged 30 calls per hour to release-memory.

Having counted out-calls by layer, the system optionally determines a ninth ratio of the fifth volume to a combined volume of out-calls of all out-call types made by the third layer of the software container, box 130. The system determines out-call probabilities based on out-call types and software container layers. In embodiments, this can include the system determining that the application type layer's average of 30 calls per hour to get-memory were 20% of the average of 150 out-calls per hour.

After counting out-calls by layer, the system optionally determines a tenth ratio of the sixth volume to the combined volume of out-calls of all out-call types made by the third layer of the software container, box 132. The system determines out-call probabilities based on out-call types and software container layers. For example, and without limitation, this can include the system determining that the application type layer's average of 30 calls per hour to release-memory were 20% of the average of 150 out-calls per hour.

Having determined out-call probabilities by layer, the system optionally determines an additional measure by comparing the ninth ratio to an eleventh ratio associated with the first out-call type, and by comparing the tenth ratio to a twelfth ratio associated with the second out-call type, box 134. The system measures the similarity between the software container level's out-call probabilities and other out-call probabilities. By way of example and without limitation, this can include the system determining a relative entropy measure of 0.4 by comparing 20% of calls by the application layer of the software container to get-memory and 20% of calls to release memory against 10% of calls by the application layer of the word processor application model to get-memory and 10% of calls to release memory.

After determining the additional similarity measure, the system optionally identifies any behavior or any application type associated with the application, based on the additional measure, box 136. The system uses the additional similarity measure to evaluate the software container's application. In embodiments, this can include the system using the relative entropy measure of 0.4 to conclude that the application type layer of the user-stipulated word processor application executing in the software container is either an anomalously behaving word processor application or not an actual word processor application. When the system determines a measure based on comparing the ratios for the third layer of a software container against the ratios for the third layer of a model, the system identifies any behavior or any application type based on the measures for the first, second, and third layers. For example, when considered in isolation, the relative entropy measure of 0.4 for the application type layer indicates that the application type layer of the user-stipulated word processor application is either an anomalously-behaving application type layer of a word processor application or not an application type layer of actual word processor application. When the relative entropy measure of 0.4 for the application type layer is combined with the relative entropy measure of 0.2 for the meta-application layer and the relative entropy measure of 0.8 for the base operating system layer, this combination indicates that the user-stipulated word processor application is either an anomalously behaving word processor application or not an actual word processor application. Although the preceding example describes the system determining one measure based on a corresponding application type layer, the system can determine any number of measures based on corresponding application type layers.

Having determined a similarity measure based on the time period, the system optionally determines a third volume of out-calls of the first out-call type made by the software container that is executing the application during another time period, box 138. The system counts the number of out-calls made by a software container, based on out-call types and time periods. For example, and without limitation, this can include the system determining that the software container that executed the user-stipulated word processor application for 168 hours (7 days or 1 week) had averaged 60 calls per hour to get-memory.

While identifying one type of out-call during the other time period, the system optionally determines a fourth volume of out-calls of the second out-call type made by the software container during the other time period, box 140. The system counts the number of out-calls made by a software container, based on out-call types and time periods. By way of example and without limitation, this can include the system determining that the software container that executed the user-stipulated word processor application for 1 week had averaged 30 calls per hour to release-memory.

Having identified out-calls during the other time period, the system optionally determines a fifth ratio of the third volume to a combined volume of out-calls of all out-call types made by the software container during the other time period, box 142. The system determines out-call probabilities based on out-call types and time periods. In embodiments, this can include the system determining that the week's average of 60 calls per hour to get-memory were 40% of the week's average of 150 out-calls per hour.

After identifying out-calls during the other time period, the system optionally determines a sixth ratio of the fourth volume to the combined volume of out-calls of all out-call types made by the software container during the other time period, box 144. The system determines out-call probabilities based on out-call types and time periods. For example, and without limitation, this can include the system determining that the week's average of 30 calls per hour to release-memory were 20% of the week's average of 150 out-calls per hour.

Having determined out-call probabilities based on time periods, the system optionally determines another measure by comparing the fifth ratio to a seventh ratio associated with the first out-call type, and by comparing the sixth ratio to an eighth ratio associated with the second out-call type, box 146. The system measures the similarity between the software container's out-call probabilities and other out-call probabilities during the other time period. By way of example and without limitation, this can include the system determining a relative entropy measure of 1.0 by comparing the software container's 40% of calls to get-memory and 20% of calls to release memory during the week against the word processor application model's 10% of calls to get-memory and 10% of calls to release memory during a week.

After determining another similarity measure, the system optionally identifies any behavior or any application type associated with the application based on the other measure, box 148. The system uses the other similarity measure to evaluate the container's application. In embodiments, this can include the system using the relative entropy measure of 1.0 to conclude that the user-stipulated word processor application executing in the software container is either an anomalously behaving word processor application or not an actual word processor application. When the system determines measures based on comparing the ratios for a software container during multiple time periods against the ratios for a model during corresponding time periods, the system identifies any behavior or any application type based on the measures for the multiple time periods. For example, when considered in isolation, the relative entropy measure of 1.0 for the software container during the week indicates that the user-stipulated word processor application is either an anomalously-behaving word processor application or not an actual word processor application. When the relative entropy measure of 1.0 for the software container during the week is combined with the relative entropy measure of 0.8 for the software container during the 24 hours, this combination indicates that the user-stipulated word processor application is either an anomalously behaving word processor application or not an actual word processor application. While this example describes the system determining measures that are based on multiple time periods for a software container, the system can determine measures that are based on multiple time periods for each layer of a software container.

In an alternative example, the system determines a word processor application relative entropy measure of 1.0 by comparing 40% of calls by an unknown application executing in a software containers to get-memory and 20% of calls to release memory during the week against 10% of calls by the word processor application model to get-memory and 10% of calls to release memory during a week. Further to the alternative example, the system determines a spreadsheet application relative entropy measure of 0.6 by comparing 40% of calls by the unknown application executing in the software container to get-memory and 20% of calls to release memory during the week against 20% of calls by a spreadsheet application model to get-memory and 10% of calls to release memory during a week. Completing the alternative example, the system uses the combination of the spreadsheet application relative entropy measure of 0.4 for the day and the spreadsheet application relative entropy measure of 0.6 for the week to determine that the unknown application executing in the software container is likely to be a spreadsheet application, and uses the combination of the word processor application relative entropy measure of 0.8 for the day and the word processor application relative entropy measure of 1.0 for the week to determine that the unknown application executing in the software container is unlikely to be a word processor application.

The method 100 may be repeated as desired. Although this disclosure describes the blocks 102-148 executing in a particular order, the blocks 102-148 may be executed in a different order. In other implementations, each of the blocks 102-148 may also be executed in combination with other blocks and/or some blocks may be divided into a different set of blocks.

System Overview

Figure 2:
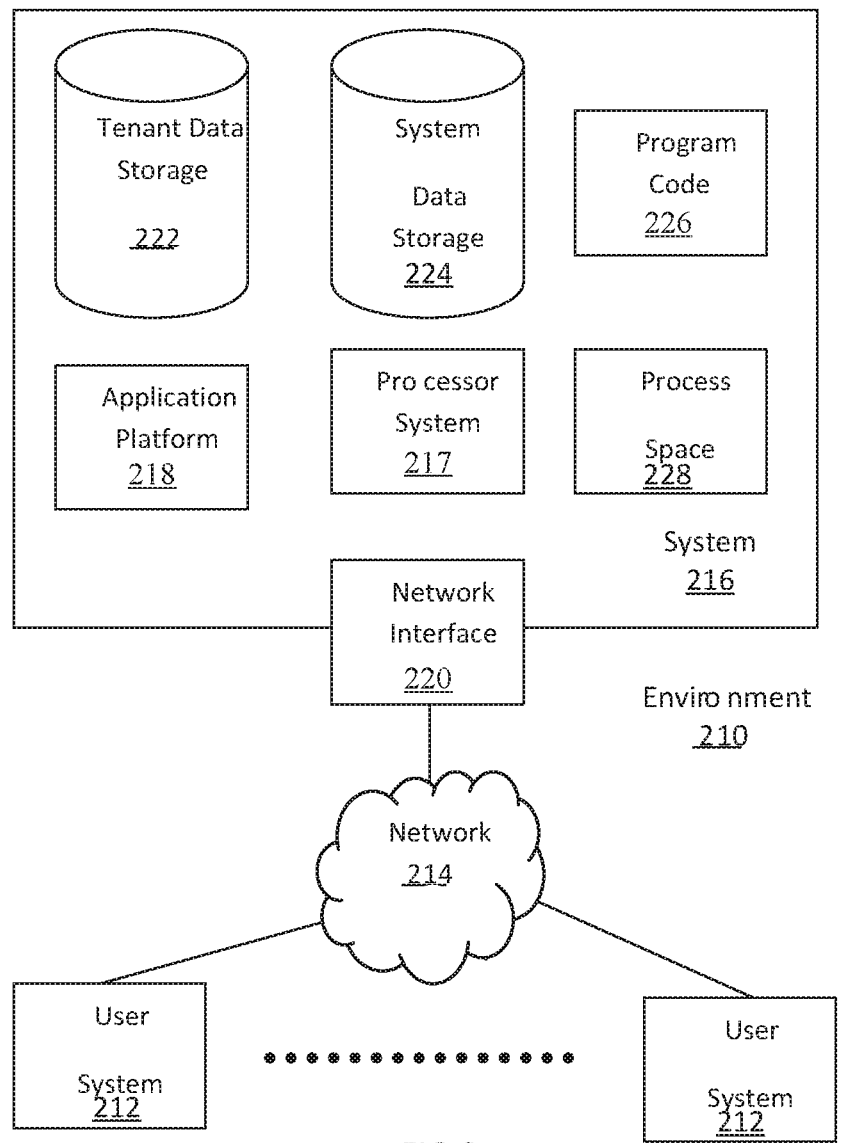
FIG. 2 illustrates a block diagram of an example of an environment wherein an on-demand database service might be used.

FIG. 2 illustrates a block diagram of an environment 210 wherein an on-demand database service might be used. The environment 210 may include user systems 212, a network 214, a system 216, a processor system 217, an application platform 218, a network interface 220, a tenant data storage 222, a system data storage 224, program code 226, and a process space 228. In other embodiments, the environment 210 may not have all of the components listed and/or may have other elements instead of, or in addition to, those listed above.

The environment 210 is an environment in which an on-demand database service exists. A user system 212 may be any machine or system that is used by a user to access a database user system. For example, any of the user systems 212 may be a handheld computing device, a mobile phone, a laptop computer, a work station, and/or a network of computing devices. As illustrated in FIG. 2 (and in more detail in FIG. 3) the user systems 212 might interact via the network 214 with an on-demand database service, which is the system 216.

An on-demand database service, such as the system 216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 216" and the "system 216" will be used interchangeably herein. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the on-demand database service 216 may include the application platform 218 which enables creation, managing and executing one or more applications developed by the provider of the on-demand database service, users accessing the on-demand database service via user systems 212, or third-party application developers accessing the on-demand database service via the user systems 212.

The users of the user systems 212 may differ in their respective capacities, and the capacity of a particular user system 212 might be entirely determined by permissions (permission levels) for the current user. For example, where a salesperson is using a particular user system 212 to interact with the system 216, that user system 212 has the capacities allotted to that salesperson. However, while an administrator is using that user system 212 to interact with the system 216, that user system 212 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 212 might communicate with the system 216 using TCP/IP and, at a higher network level, use other common Internet protocols to communicate, such as HTTP, FTP, AFS, WAP, etc. In an example where HTTP is used, the user systems 212 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 216, shown in FIG. 2, implements a web-based customer relationship management (CRM) system. For example, in one embodiment, the system 216 includes application servers configured to implement and execute CRM software applications as well as provide related data, code, forms, webpages and other information to and from the user systems 212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 216 implements applications other than, or in addition to, a CRM application. For example, the system 216 may provide tenant access to multiple hosted (standard and custom) applications, including a CRM application. User (or third-party developer) applications, which may or may not include CRM, may be supported by the application platform 218, which manages creation, storage of the applications into one or more database objects and executing of the applications in a virtual machine in the process space of the system 216.

One arrangement for elements of the system 216 is shown in FIG. 2, including the network interface 220, the application platform 218, the tenant data storage 222 for tenant data 223, the system data storage 224 for system data 225 accessible to the system 216 and possibly multiple tenants, the program code 226 for implementing various functions of the system 216, and the process space 228 for executing MTS system processes and tenant-specific processes, such as running applications as part of an application hosting service. Additional processes that may execute on the system 216 include database indexing processes.

Several elements in the system shown in FIG. 2 include conventional, well-known elements that are explained only briefly here. For example, each of the user systems 212 could include a desktop personal computer, workstation, laptop, PDA, cell phone, or any wireless access protocol (WAP) enabled device or any other computing device capable of interfacing directly or indirectly to the Internet or other network connection. Each of the user systems 212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 212 to access, process and view information, pages and applications available to it from the system 216 over the network 214. Each of the user systems 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 212 and all of its components are operator configurable using applications, such as a browser, including computer code run using a central processing unit such as an Intel Pentium® processor or the like. Similarly, the system 216 (and additional instances of an MTS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 216 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 216 is configured to provide webpages, forms, applications, data and media content to the user (client) systems 212 to support the access by the user systems 212 as tenants of the system 216. As such, the system 216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 3:
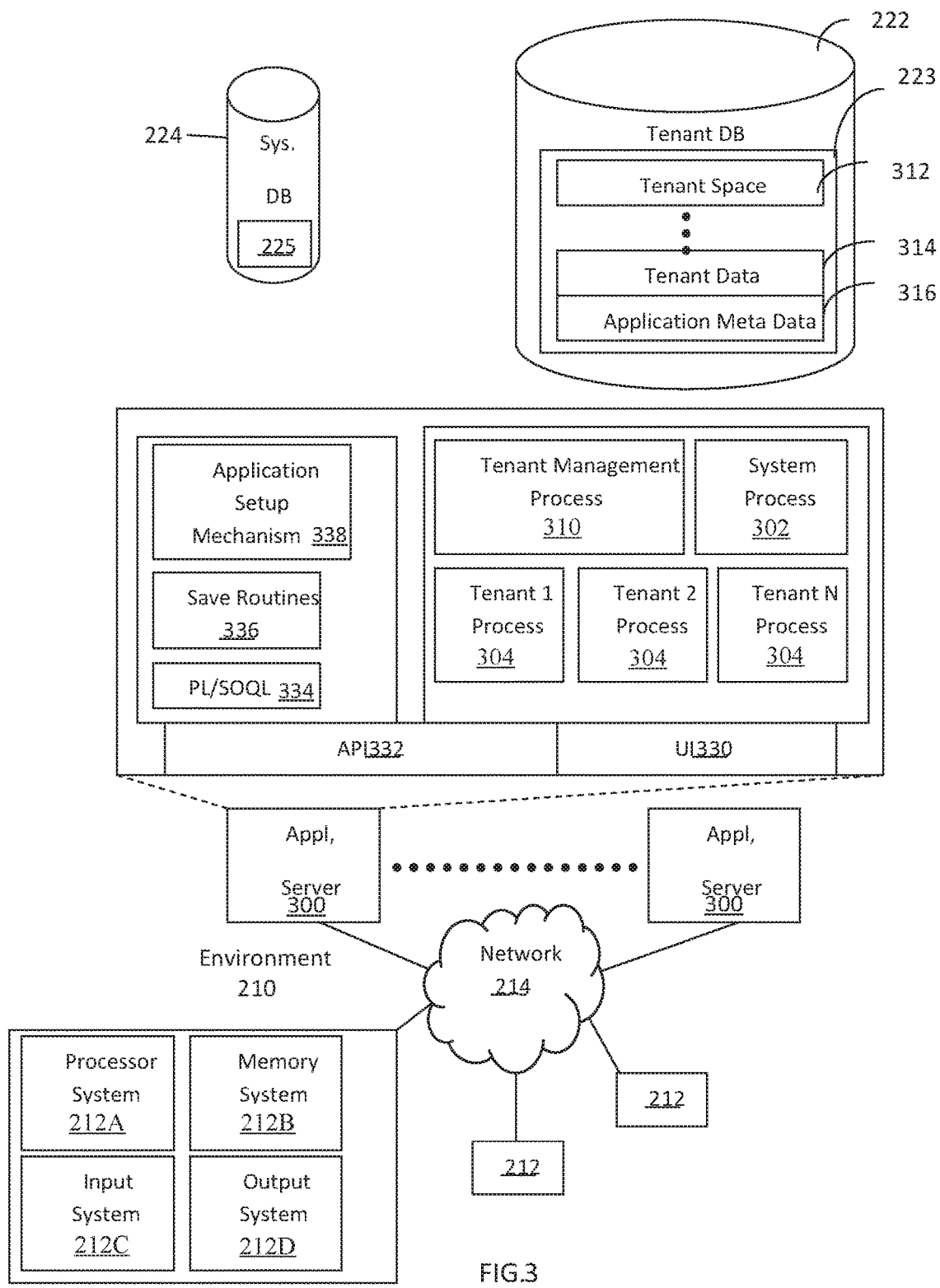
FIG. 3 illustrates a block diagram of an embodiment of elements of FIG. 2 and various possible interconnections between these elements.

FIG. 3 also illustrates the environment 210. However, in FIG. 3 elements of the system 216 and various interconnections in an embodiment are further illustrated. FIG. 3 shows that the each of the user systems 212 may include a processor system 212A, a memory system 212B, an input system 212C, and an output system 212D. FIG. 3 shows the network 214 and the system 216. FIG. 3 also shows that the system 216 may include the tenant data storage 222, the tenant data 223, the system data storage 224, the system data 225, a User Interface (UI) 330, an Application Program Interface (API) 332, a PL/SOQL 334, save routines 336, an application setup mechanism 338, applications servers 300₁-300N, a system process space 302, tenant process spaces 304, a tenant management process space 310, a tenant storage area 312, a user storage 314, and application metadata 316. In other embodiments, the environment 210 may not have the same elements as those listed above and/or may have other elements instead of, or in addition to, those listed above.

The user systems 212, the network 214, the system 216, the tenant data storage 222, and the system data storage 224 were discussed above in FIG. 2. Regarding the user systems 212, the processor system 212A may be any combination of one or more processors. The memory system 212B may be any combination of one or more memory devices, short term, and/or long-term memory. The input system 212C may be any combination of input devices, such as one or more keyboards, mice, trackballs, scanners, cameras, and/or interfaces to networks. The output system 212D may be any combination of output devices, such as one or more monitors, printers, and/or interfaces to networks. As shown by FIG. 3, the system 216 may include the network interface 220 (of FIG. 2) implemented as a set of HTTP application servers 300, the application platform 218, the tenant data storage 222, and the system data storage 224. Also shown is the system process space 302, including individual tenant process spaces 304 and the tenant management process space 310. Each application server 300 may be configured to access tenant data storage 222 and the tenant data 223 therein, and the system data storage 224 and the system data 225 therein to serve requests of the user systems 212. The tenant data 223 might be divided into individual tenant storage areas 312, which can be either a physical arrangement and/or a logical arrangement of data. Within each tenant storage area 312, the user storage 314 and the application metadata 316 might be similarly allocated for each user. For example, a copy of a user's most recently used (MRU) items might be stored to the user storage 314. Similarly, a copy of MRU items for an entire organization that is a tenant might be stored to the tenant storage area 312. The UI 330 provides a user interface and the API 332 provides an application programmer interface to the system 216 resident processes to users and/or developers at the user systems 212. The tenant data and the system data may be stored in various databases, such as one or more Oracle™ databases.

The application platform 218 includes the application setup mechanism 338 that supports application developers' creation and management of applications, which may be saved as metadata into the tenant data storage 222 by the save routines 336 for execution by subscribers as one or more tenant process spaces 304 managed by the tenant management process 310 for example. Invocations to such applications may be coded using the PL/SOQL 334 that provides a programming language style interface extension to the API 332. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 316 for the subscriber making the invocation and executing the metadata as an application in a virtual machine.

Each application server 300 may be communicably coupled to database systems, e.g., having access to the system data 225 and the tenant data 223, via a different network connection. For example, one application server 300₁ might be coupled via the network 214 (e.g., the Internet), another application server 300$_{N-1}$ might be coupled via a direct network link, and another application server 300N might be coupled by yet a different network connection. Transfer Control Protocol and Internet Protocol (TCP/IP) are typical protocols for communicating between application servers 300 and the database system. However, it will be apparent to one skilled in the art that other transport protocols may be used to optimize the system depending on the network interconnect used.

In certain embodiments, each application server 300 is configured to handle requests for any user associated with any organization that is a tenant. Because it is desirable to be able to add and remove application servers from the server pool at any time for any reason, there is preferably no server affinity for a user and/or organization to a specific application server 300. In one embodiment, therefore, an interface system implementing a load balancing function (e.g., an F5 Big-IP load balancer) is communicably coupled between the application servers 300 and the user systems 212 to distribute requests to the application servers 300. In one embodiment, the load balancer uses a least connections algorithm to route user requests to the application servers 300. Other examples of load balancing algorithms, such as round robin and observed response time, also can be used. For example, in certain embodiments, three consecutive requests from the same user could hit three different application servers 300, and three requests from different users could hit the same application server 300. In this manner, the system 216 is multi-tenant, wherein the system 216 handles storage of, and access to, different objects, data and applications across disparate users and organizations.

As an example of storage, one tenant might be a company that employs a sales force where each salesperson uses the system 216 to manage their sales process. Thus, a user might maintain contact data, leads data, customer follow-up data, performance data, goals and progress data, etc., all applicable to that user's personal sales process (e.g., in the tenant data storage 222). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 216 might also maintain system level data usable by multiple tenants or other data. Such system level data might include industry reports, news, postings, and the like that are sharable among tenants.

In certain embodiments, the user systems 212 (which may be client systems) communicate with the application servers 300 to request and update system-level and tenant-level data from the system 216 that may require sending one or more queries to the tenant data storage 222 and/or the system data storage 224. The system 216 (e.g., an application server 300 in the system 216) automatically generates one or more SQL statements (e.g., one or more SQL queries) that are designed to access the desired information. The system data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
determine a first volume of out-calls of a first out-call type made by a software container that is executing an application during a time period;
determine a second volume of out-calls of a second out-call type made by the software container;

determine a first ratio of the first volume to a combined volume of out-calls of all out-call types made by the software container;

determine a second ratio of the second volume to the combined volume of out-calls of all out-call types made by the software container;

determine a measure by comparing the first ratio to a third ratio associated with the first out-call type, and by comparing the second ratio to a fourth ratio associated with the second out-call type; and identify one of any behavior and any application type associated with the application, based on the measure.

2. The system of claim 1, wherein the third ratio and the fourth ratio are associated with the application during another time period.

3. The system of claim 1, wherein the first ratio, the second ratio, the third ratio, and the fourth ratio are associated with a first layer of the software container.

4. The system of claim 3, comprising further instructions, which when executed, cause the one or more processors to:

determine a third volume of out-calls of the first out-call type made by a second layer of the software container that is executing the application during the time period;

determine a fourth volume of out-calls of the second out-call type made by the second layer;

determine a fifth ratio of the third volume to a combined volume of out-calls of all out-call types made by the second layer;

determine a sixth ratio of the fourth volume to the combined volume of out-calls of all out-call types made by the second layer;

determine another measure by comparing the fifth ratio to a seventh ratio associated with the first out-call type, and by comparing the sixth ratio to an eighth ratio associated with the second out-call type; and identify one of any behavior and any application type associated with the application, based on the other measure.

5. The system of claim 4, comprising further instructions, which when executed, cause the one or more processors to:

determine a fifth volume of out-calls of the first out-call type made by a third layer of the software container that is executing the application during the time period;

determine a sixth volume of out-calls of the second out-call type made by the third layer;

determine a ninth ratio of the fifth volume to a combined volume of out-calls of all out-call types made by the third layer;

determine a tenth ratio of the sixth volume to the combined volume of out-calls of all out-call types made by the third layer;

determine an additional measure by comparing a fifth comparison of the ninth ratio to an eleventh ratio associated with the first out-call type, and by comparing the tenth ratio to a twelfth ratio associated with the second out-call type; and identify one of any behavior and any application type associated with the application, based on the additional measure.

6. The system of claim 1, comprising further instructions, which when executed, cause the one or more processors to:

determine a third volume of out-calls of the first out-call type made by the software container that is executing the application during another time period;

determine a fourth volume of out-calls of the second out-call type made by the software container during the other time period;

determine a fifth ratio of the third volume to a combined volume of out-calls of all out-call types made by the software container during the other time period;

determine a sixth ratio of the fourth volume to the combined volume of out-calls of all out-call types made by the software container during the other time period;

determine another measure by comparing the fifth ratio to a seventh ratio associated with the first out-call type, and by comparing the sixth ratio to an eighth ratio associated with the second out-call type; and identify one of any behavior and any application type associated with the application, based on the other measure.

7. The system of claim 1, wherein the measure comprises a relative entropy measure.

8. A computer program product comprising non-transitory computer-readable medium storing computer-readable program code to be executed by one or more processors, the computer-readable program code including instructions to:

determine a first volume of out-calls of a first out-call type made by a software container that is executing an application during a time period;

determine a second volume of out-calls of a second out-call type made by the software container;

determine a first ratio of the first volume to a combined volume of out-calls of all out-call types made by the software container;

determine a second ratio of the second volume to the combined volume of out-calls of all out-call types made by the software container;

determine a measure by comparing the first ratio to a third ratio associated with the first out-call type, and by comparing the second ratio to a fourth ratio associated with the second out-call type; and identify one of any behavior and any application type associated with the application, based on the measure.

9. The computer program product of claim 8, wherein the third ratio and the fourth ratio are associated with the application during another time period.

10. The computer program product of claim 8, wherein the first ratio, the second ratio, the third ratio, and the fourth ratio are associated with a first layer of the software container.

11. The computer program product of claim 10, wherein the program code comprises further instructions to:

determine a third volume of out-calls of the first out-call type made by a second layer of the software container that is executing the application during the time period;

determine a fourth volume of out-calls of the second out-call type made by the second layer;

determine a fifth ratio of the third volume to a combined volume of out-calls of all out-call types made by the second layer;

determine a sixth ratio of the fourth volume to the combined volume of out-calls of all out-call types made by the second layer;

determine another measure by comparing the fifth ratio to a seventh ratio associated with the first out-call type, and by comparing the sixth ratio to an eighth ratio associated with the second out-call type; and identify one of any behavior and any application type associated with the application, based on the other measure.

12. The computer program product of claim 11, wherein the program code comprises further instructions to:
- determine a fifth volume of out-calls of the first out-call type made by a third layer of the software container that is executing the application during the time period;
- determine a sixth volume of out-calls of the second out-call type made by the third layer;
- determine a ninth ratio of the fifth volume to a combined volume of out-calls of all out-call types made by the third layer;
- determine a tenth ratio of the sixth volume to the combined volume of out-calls of all out-call types made by the third layer;
- determine an additional measure by comparing a fifth comparison of the ninth ratio to an eleventh ratio associated with the first out-call type, and by comparing the tenth ratio to a twelfth ratio associated with the second out-call type; and
- identify one of any behavior and any application type associated with the application, based on the additional measure.

13. The computer program product of claim 8, wherein the program code comprises further instructions to:
- determine a third volume of out-calls of the first out-call type made by the software container that is executing the application during another time period;
- determine a fourth volume of out-calls of the second out-call type made by the software container during the other time period;
- determine a fifth ratio of the third volume to a combined volume of out-calls of all out-call types made by the software container during the other time period;
- determine a sixth ratio of the fourth volume to the combined volume of out-calls of all out-call types made by the software container during the other time period;
- determine another measure by comparing the fifth ratio to a seventh ratio associated with the first out-call type, and by comparing the sixth ratio to an eighth ratio associated with the second out-call type; and
- identify one of any behavior and any application type associated with the application, based on the other measure.

14. A method comprising:
- determining, by a database system, a first volume of out-calls of a first out-call type made by a software container that is executing an application during a time period;
- determining, by the database system, a second volume of out-calls of a second out-call type made by the software container;
- determining, by the database system, a first ratio of the first volume to a combined volume of out-calls of all out-call types made by the software container;
- determining, by the database system, a second ratio of the second volume to the combined volume of out-calls of all out-call types made by the software container;
- determining, by the database system, a measure by comparing the first ratio to a third ratio associated with the first out-call type, and by comparing the second ratio to a fourth ratio associated with the second out-call type; and
- identifying, by the database system, one of any behavior and any application type associated with the application, based on the measure.

15. The method of claim 14, wherein the third ratio and the fourth ratio are associated with the application during another time period.

16. The method of claim 14, wherein the first ratio, the second ratio, the third ratio, and the fourth ratio are associated with a first layer of the software container.

17. The method of claim 16, the method further comprising:
- determining, by the database system, a third volume of out-calls of the first out-call type made by a second layer of the software container that is executing the application during the time period;
- determining, by the database system, a fourth volume of out-calls of the second out-call type made by the second layer;
- determining, by the database system, a fifth ratio of the third volume to a combined volume of out-calls of all out-call types made by the second layer;
- determining, by the database system, a sixth ratio of the fourth volume to the combined volume of out-calls of all out-call types made by the second layer;
- determining, by the database system, another measure by comparing the fifth ratio to a seventh ratio associated with the first out-call type, and by comparing the sixth ratio to an eighth ratio associated with the second out-call type; and
- identifying, by the database system, one of any behavior and any application type associated with the application, based on the other measure.

18. The method of claim 17, the method further comprising:
- determining, by the database system, a fifth volume of out-calls of the first out-call type made by a third layer of the software container that is executing the application during the time period;
- determining, by the database system, a sixth volume of out-calls of the second out-call type made by the third layer;
- determining, by the database system, a ninth ratio of the fifth volume to a combined volume of out-calls of all out-call types made by the third layer;
- determining, by the database system, a tenth ratio of the sixth volume to the combined volume of out-calls of all out-call types made by the third layer;
- determining, by the database system, an additional measure by comparing a fifth comparison of the ninth ratio to an eleventh ratio associated with the first out-call type, and by comparing the tenth ratio to a twelfth ratio associated with the second out-call type; and
- identifying, by the database system, one of any behavior and any application type associated with the application, based on the additional measure.

19. The method of claim 14, the method further comprising:
- determining, by the database system, a third volume of out-calls of the first out-call type made by the software container that is executing the application during another time period;
- determining, by the database system, a fourth volume of out-calls of the second out-call type made by the software container during the other time period;
- determining, by the database system, a fifth ratio of the third volume to a combined volume of out-calls of all out-call types made by the software container during the other time period;
- determining, by the database system, a sixth ratio of the fourth volume to the combined volume of out-calls of all out-call types made by the software container during the other time period;

determining, by the database system, another measure by comparing the fifth ratio to a seventh ratio associated with the first out-call type, and by comparing the sixth ratio to an eighth ratio associated with the second out-call type; and identifying, by the database system, one of any behavior and any application type associated with the application, based on the other measure.

20. The method of claim 14, wherein the measure comprises a relative entropy measure.

* * * * *